United States Patent Office 3,445,424
Patented May 20, 1969

3,445,424
STABILIZATION OF POLYMERS WITH UV
STABILIZERS AND ANTIOXIDANTS
Robert J. Martinovich, Bartlesville, Okla., assignor
to Phillips Petroleum Company, a corporation of
Delaware
No Drawing. Continuation-in-part of application Ser. No.
207,017, July 2, 1962. This application Dec. 18, 1967,
Ser. No. 691,139
Int. Cl. C08f 45/58, 29/04, 29/02
U.S. Cl. 260—45.85       2 Claims

ABSTRACT OF THE DISCLOSURE

A solid polymer of an aliphatic 1-monoolefin is stabilized against weathering by incorporating an antioxidant such as, for instance, dilaurylthiodipropionate or 4,4'-thiobis-(3-methyl-6-t-butyl phenol), and a UV stabilizer such as, for instance, 2-hydroxy-4-n-octoxybenzophenone, into the polymer.

CROSS REFERENCE TO RELATED INVENTIONS

This is a continuation-in-part of my copending application Ser. No. 207,017, filed July 2, 1962, now Patent Number 3,370,036 issued Sept. 28, 1967.

BACKGROUND OF THE INVENTION

This invention relates to the stabilization of a polymer. It relates to the stabilization against ultraviolet radiation or oxidative or heat degradation of a polymer, for example a 1-olefin polymer or a copolymer of a 1-olefin with a higher molecular weight 1-olefin, e.g., a copolymer of ethylene and 1-butene.

SUMMARY OF THE INVENTION

It is an object of this invention to stabilize a polymer to preserve its desirable properties such as tensile strength, etc. It is another object of this invention to stabilize a polymer of a 1-olefin. It is a further object of this invention to stabilize a copolymer of a 1-olefin and a higher molecular weight 1-olefin. It is a further object of this invention to stabilize against ultraviolet degradation a solid polymer or copolymer of a 1-olefin. It is a further object of this invention to provide a method for the stabilization of a polymer or copolymer such as polyolefin or copolymerized olefins obtained by polymerizing or copolymerizing 1-olefins as herein described. It is a still further object of this invention to provide a composition of additives suitable for addition to a polymer or a copolymer for stabilizing the same against ultraviolet degradation, oxidative or heat deterioration and to preserve the desirable properties of the polymer or copolymer.

Other objects and the several advantages of the invention are apparent from a study of this disclosure and the appended claims.

According to the invention, the tensile strength of a polymer such as a solid polymer of a 1-olefin, e.g. polyethylene, polypropylene, etc., or a copolymer of say ethylene and a higher 1-olefin, as prepared by methods known in the art, for example, as disclosed and claimed in Patent 2,825,721, issued Mar. 4, 1958, John Paul Hogan and Robert L. Banks, is markedly preserved by incorporating therewith a small amount each of a stabilizer against ultraviolet light and an antioxidant. Also, according to the invention, compositions of these additives are provided.

DESCRIPTION OF THE PREFERRED EMBODIMENTS

The polyolefins or polymers or copolymers to which the invention is applicable include those which can be prepared from aliphatic 1-olefins having from 2 to 8 carbon atoms per molecule and no branching nearer the double bond than the 4-position at a polymerization temperature of up to about 500° F. with a catalyst active for such polymerization and comprising chromium oxide upon a suitable carrier, at least a part of the chromium being in the hexavalent state when the hydrocarbon contacts the catalyst at the initial contacting of the catalyst with the hydrocarbon.

Other polymers and copolymers, including solid polymers and copolymers, of 1-olefins prepared by other known methods can also be stabilized according to the present invention, which will now be described as applied to a solid polymer of ethylene and a solid copolymer of ethylene and 1-butene.

It will be understood by one skilled in the art in possession of this disclosure and the general knowledge of the art relating to the ultraviolet or oxidative degradation of polyolefins such as polyethylene, polypropylene, etc., and copolymers as herein discussed, that the results which are herein exemplified by data obtained with the herein identified polyolefin (polyethylene) and copolymer (ethylene and 1-butene copolymer) can also be obtained with other related polymers or copolymers.

Polymer (A) in Examples 1 through 4 was polyethylene. Polymer (B) in Example 5 was a copolymer of ethylene and butene-1. This polymer contained about 2.5 percent butene-1. The polymer and copolymer are characterized by the following properties:

| Property: | Polymer (A) | Polymer (B) | Test Method |
|---|---|---|---|
| Density | 0.960 gms./cc | 0.950 gms./cc | ASTM D1505-57T. |
| Melt Index | 0.2 | 1.2 | ASTM D1238-57T. |
| Tensile Strength | 4,400 p.s.i | 3,800 p.s.i | ASTM D638-58T. |
| Elongation | 30 percent | 40 percent | ASTM D638-58T. |
| Environmental Stress: Cracking Resistance | 60 hours | 55 hours | ASTM D1693-59T. |

Example I

Using polymer (A) (polyethylene) the following additives were incorporated as herein described:

Santonox (Monsanto Chemical Company), antioxidant—4,4'-thiobis-(3-methyl-6-t-butyl phenol)
TBS (Dow Chemical Company), UV stabilizer—paratertiary-butyl phenyl salicylate

| Sample Run | Additive, percent | Weather-Ometer, hours | Tensile Strength, p.s.i. | Elongation percent |
|---|---|---|---|---|
| 1 | Control | 200 | 2,330 | 4.0 |
| 2 | 0.10 Santonox | 500 | 2,080 | 4.0 |
| 3 | 0.10 TBS | 800 | 1,870 | 2.5 |
| 4 | 0.25 TBS | 1,250 | 1,560 | 3.0 |
| 5 | 0.50 TBS | 2,000 | 1,993 | 4.0 |
| 6 | 0.10 Santonox-0.50 TBS | 3,500 | 3,670 | 14.0 |

The control prior to exposure in the Weather-Ometer had a tensile strength of 4400. After 200 hours exposure the tensile strength, as shown in the table, had been reduced to 2330. Elongation was 4 percent for this sample.

Whereas after 500 hours with 0.1 percent 4,4'-thiobis-(3-methyl-6-t-butyl phenol) and 0.5 percent of paratertiary-butyl phenyl salicylate, after 2000 hours exposure, the tensile strengths were, for additional polyethylene compounded, as stated, 2080 and 1993, respectively, a sample of the polyethylene, here identified, including a combination of the additives in the recited percentages, namely 0.1 percent of the former and 0.5 percent of the latter, having been exposed for 3500 hours, gave a tensile strength of 3670. The elongations for the three samples here discussed, namely samples 2, 5 and 6, respectively, were 4, 4 and 14, respectively.

Thus when both additives were added according to the invention, in combination, a 3½ fold increase in elongation was obtained and the tensile strength was about 55 percent greater than that of the control run, Run 1, and this after testing for 17 times as long as the testing in the control run, i.e., testing for 3500 hours in Run 6 as against only 200 hours in Run 1.

It is evident from the foregoing table and its discussion that the use of the combination of the two additives to stabilize a polyolefin such as polyethylene yields unexpectedly very greatly improved results. These results could not have been foreseen. When it is borne in mind that the additives employed are each of them considered to be very good products for increasing resistance to ultraviolet light and other degradation upon exposure, it will be recognized that the improvement here demonstrated is quite out of the ordinary.

In the following are given additional examples of the invention. Similar discussion to that of Example I can be made in regard to said examples.

Example II–A

UV 531 (American Cyanamid Co.), UV stabilizer—2-hydroxy-4-n-octoxybenzophenone
DLTDP (American Cyanamid Co.), antioxidant—Dilaurylthiodipropionate

POLYMER (A)

| Sample Run | Additive, percent | Weather-Ometer, hours | Tensile Strength, p.s.i. | Elongation, percent |
|---|---|---|---|---|
| 1 | Control | 200 | 2,330 | 4.0 |
| 2 | 0.25 UV 531 | 1,500 | 3,200 | <5.0 |
| 3 | 0.05 DLTDP | 500 | <2,000 | <5.0 |
| 4 | 0.05 DLTDP-0.25 UV 531 | 2,500 | 4,400 | 15.0 |

Example II–B

Base polymer—Identical Polymer B except melt index was 0.3.

| Sample | Additive, percent | Weather-Ometer, hours | Tensile Strength, p.s.i. | Elongation, percent |
|---|---|---|---|---|
| Control 1 | 0.3 UV 531 | 0 | 3,650 | 82 |
| Control 2 | 0.3 DLTDP | 0 | 3,700 | 143 |
| Run 1 | 0.25 UV 531-0.05 DLTDP | 0 | 3,650 | 75 |
| Control 3 | 0.3 UV 531 | 500 | 4,000 | 30 |
| Control 4 | 0.3 DLTDP | 500 | 3,650 | 17 |
| Run 2 | 0.25 UV 531-0.05 DLTDP | 500 | 3,950 | 83 |
| Control 5 | 0.3 UV 531 | 1,000 | 3,450 | 28 |
| Control 6 | 0.3 DLTDP | 1,000 | 490 | 3 |
| Run 3 | 0.25 UV 531-0.05 DLTDP | 1,000 | 3,950 | 38 |

It can be seen from a comparison of Controls 5 and 6 with Run 3 that at 1000 hours a stabilizer system comprising both the UV stabilizer and the antioxidant has higher tensile and higher elongation than samples containing either component in the same total concentration. As can be seen from Example II–A this synergistic effect is even more pronounced after a greater time of exposure.

Example III

Dow Chemical Co., UV stabilizer—bis-phenol-A-disalicylate
Dow Chemical Co., antioxidant—4,4-isopropylidene-bis-2-tertiary butyl phenol

POLYMER (A)

| Sample Run | Additive, percent | Weather-Ometer, hours | Tensile Strength, p.s.i. | Elongation, percent |
|---|---|---|---|---|
| 1 | Control | 200 | 2,330 | 4.0 |
| 2 | 0.50 UV Stabilizer | 2,500 | 2,800 | 4.0 |
| 3 | 0.50 Stabilizer-0.1 Antioxidant | 3,000 | 3,270 | 14.00 |

Example IV

Santonox (Monsanto Chemical Co.), antioxidant—4,4'-thiobis-(3-methyl-6-t-butyl phenol)
OPS (Eastman Chemical Co.), UV stabilizer—p-octylphenyl salicylate

POLYMER (A)

| Sample Run | Additive, percent | Weather-Ometer, hours | Tensile Strength, p.s.i. | Elongation, percent |
|---|---|---|---|---|
| 1 | Control | 200 | 2,330 | 4.0 |
| 2 | 0.5 OPS | 3,500 | 1,960 | 3.0 |
| 3 | 0.1 Santonox | 500 | 2,080 | 4.0 |
| 4 | 0.5 OPS-0.1 Santonox | 3,500 | 4,040 | 18.0 |

Example V

Santonox (Monsanto Chemical Co.), antioxidant—4,4'-thiobis-(3-methyl-6-t-butyl phenol)
UV 531 (American Cyanamid Co.), UV stabilizer—2-hydroxy-4-n-octoxybenzophenone

POLYMER (B)

| Sample Run | Additive, percent | Weather-Ometer, hours | Tensile Strength, p.s.i. | Elongation, percent |
|---|---|---|---|---|
| 1 | Control | 200 | <2,000 | <5.0 |
| 2 | 0.10 Santonox | 500 | <2,000 | <5.0 |
| 3 | 0.5 UV 531 | 1,250 | 1,895 | 3.0 |
| 4 | 0.1 Santonox-0.5 UV 531 | 1,250 | 3,690 | 9.0 |
| 5 | do | 6,000 | 3,700 | 10.0 |

It appears that when both an ultraviolet stabilizer and an antioxidant are incorporated into a polymer or copolymer, here discussed, a more than additive effect occurs and that, indeed, the tensile strength of the compounded materials is very considerably improved.

The polyolefins to which this invention is particularly applicable, with results similar to those herein set forth, are the polymers and copolymers especially solid polymers and copolymers, of ethylene, propylene, butene-1, pentene-1, hexene-1, heptene-1, and octene-1.

The combination of additives can be blended into the polymers by known methods, for example by simply melting the polymer or sufficiently softening the same so that the additives can be mechanically blended thereinto, either as such or dissolved in a suitable solvent which then can be recovered from the blend. Also, the additives can be blended into the polymers during a stage of recovery from the process of their preparation. In the obtaining of the above data the additives were incorporated as follows. Samples were mill blended. Dry polymer was placed on a two-roll mill and milled until molten, then additives were added and milling continued for a total time of ten minutes. Temperature of milling was between 300–350° F.

Generally, according to the invention, the amount of the antioxidant, for example, 4,4'-thiobis-(3-methyl-6-t-butyl phenol), incorporated with the ultraviolet stabilizer, for example, paratertiary-butyl phenyl salicylate, into the polymer or copolymer to be improved with respect to its tensile strength or stability characteristics will be in the range of 0.05 to 0.1 percent while the amount of the latter will be 0.25 to about 0.9 or 1, preferably about 0.5, percent by weight of the polymer to be stabilized. Further, the ratio of the latter aditive to the former in the combination of the additives in the polymer will usually lie in the range 2.5 to 1 to 10 to 1.

The compounds which are combined in the present invention to stabilize the polymers or copolymers to permit the compounding of polymers which exhibit a Weather-Ometer life period which is considerably larger than would be expected from the life period obtained by adding the effects of each of the compounds used in the same amounts singly with the polymers or copolymers are generally available and known in the art as ultraviolet stabilizers and antioxidants.

The following compounds, which are now preferred, can be used as in the examples.

TABLE

| Ultraviolet Light Stabilizers | Antioxidants |
|---|---|
| TBS (Dow Chemical Co.) paratertiary-butyl phenyl salicylate. | Santonox (Monsanto Chemical Co.) 4,4'-thiobis-(3-methyl-6-t-butyl phenol). |
| UV 531 (American Cyanamid Co.) 2-hydroxy-4-n-octoxybenzophenone. | DLTDP (American Cyanamid Co.) Dilaurylthiodipropionate. |
| (Dow Chemical Co.) bis-phenol-A-disalicylate. | (Dow Chemical Co.) 4,4-isopropylidene-bis-2-tertiary butyl phenol. |
| OPS (Eastman Chemical Co.) p-octylphenyl salicylate. | |
| UV 314 (American Cyanamid Co.) 2,2-dihydroxy-4-n-octoxy benzophenone. | |

The polyethylene and copolymers used in the foregoing tests are generally available under the trademark Marlex, which is the Phillips Petroleum Company's trademark for polyolefins produced by the so-called low pressure process, as now known in the art. The polymer of Example II–B contained no pigment. The polymer of Run 5, Example V, contained 2 percent No. 1409 cadmium orange pigment. All of the other samples contained 1 percent cadmium orange pigment. The tests were carried out by aging in an Atlas Weather-Ometer.

It will be evident to one skilled in the art that according to this invention there is also provided a combination of additives, as disclosed, suitable for incorporation and coaction in similar or related polymeric substances.

Reasonable variation and modification are possible within the scope of the foregoing disclosure and the appended claims to the invention.

I claim:
1. A solid polymer of an aliphatic mono-1-olefin having a maximum of 8 carbon atoms and no branching nearer the double bond than the 4-position stabilized with a stabilizer combination comprising 0.25 to 0.9 weight percent based on the weight of said polymer of 2-hydroxy-4-n-octoxybenzophenone and from 0.05 to 0.1 weight percent based on the weight of said polymer of dilaurylthiodipropionate.

2. A composition according to claim 1 wherein said polymer is selected from the group consisting of polyethylene and ethylene-butene-1 copolymer.

References Cited

UNITED STATES PATENTS

| | | | |
|---|---|---|---|
| 3,000,857 | 9/1961 | Craven | 260—45.95 |
| 3,006,959 | 10/1961 | Armitage et al. | 260—45.95 |
| 3,098,842 | 7/1963 | Armitage et al. | 260—45.95 |
| 3,322,705 | 5/1967 | Kauder et al. | 260—45.95 |
| 2,972,597 | 2/1961 | Newland | 260—45.85 |
| 3,144,422 | 8/1964 | Homberg | 260—45.85 |
| 2,956,982 | 10/1960 | McCall et al. | 260—45.85 |

DONALD E. CZAJA, *Primary Examiner.*

H. E. TAYLOR, JR., *Assistant Examiner.*

U.S. Cl. X.R.

260—41, 45.95